(12) United States Patent (10) Patent No.: US 12,340,117 B2
Luo et al. (45) Date of Patent: Jun. 24, 2025

(54) TENSOR MEMORY ACCESS BASED IMPLEMENTATION FOR MASSIVE AND ULTRA-MASSIVE MIMO SYSTEMS

(71) Applicant: Micron Technology, Inc., Boise, ID (US)

(72) Inventors: Fa-Long Luo, San Jose, CA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 67 days.

(21) Appl. No.: 17/929,954

(22) Filed: Sep. 6, 2022

(65) Prior Publication Data

US 2024/0078040 A1 Mar. 7, 2024

(51) Int. Cl.
*G06F 3/06* (2006.01)

(52) U.S. Cl.
CPC .......... *G06F 3/0659* (2013.01); *G06F 3/0622* (2013.01); *G06F 3/0656* (2013.01); *G06F 3/067* (2013.01)

(58) Field of Classification Search
CPC .... G06F 3/0659; G06F 3/0622; G06F 3/0656; G06F 3/067
See application file for complete search history.

(56) References Cited

U.S. PATENT DOCUMENTS

| | | | |
|---|---|---|---|
| 2004/0114596 A1* | 6/2004 | Ha | H04L 1/0071 370/389 |
| 2010/0124260 A1* | 5/2010 | Devison | H04B 1/40 375/220 |
| 2018/0337710 A1* | 11/2018 | Luo | H04B 7/0413 |
| 2020/0034306 A1* | 1/2020 | Luo | G06F 12/0207 |
| 2021/0367664 A1* | 11/2021 | Akyildiz | H04B 7/1851 |

\* cited by examiner

*Primary Examiner* — Tasnima Matin
(74) *Attorney, Agent, or Firm* — Dorsey & Whitney LLP (57) ABSTRACT

Examples described herein include systems and methods which include a multiple input, multiple output transceiver including a plurality of receive antenna configured to receive a plurality of receive signals, and a wireless receiver coupled to the plurality of antenna and configured to receive and decode the plurality of receive signals. The transceiver includes a memory array and a memory controller. The memory controller includes a data address generator configured to, during the decode of the plurality of receive signals, generate at least one memory address according to an access mode of a memory command associated with a memory access operation. The at least one memory address corresponds to a specific sequence of memory access instructions to access a memory cell of the memory array.

18 Claims, 6 Drawing Sheets

TENSOR MEMORY ACCESS BASED IMPLEMENTATION FOR MASSIVE AND ULTRA-MASSIVE MIMO SYSTEMS

BACKGROUND

The use of massive multiple input, multiple output (MIMO) technology in 5G may be a large factor that results in a significant increase in the power consumption due to the complex nature of the matrix-based computations performed on the received and transmitted data. Having been used in 5G standards, massive MIMO systems can give tremendous performance improvements in terms of spectrum efficiency (SE) and energy efficiency (EE) over single antenna systems, because of their beamforming, spatial multiplexing, and multi-user capabilities. With massive MIMO technology, a base station (BS), which may be equipped with hundreds of antenna elements, can be used to serve several tens of users (UEs) simultaneously. It is believed that the antennas of a base station in 6G will be on the order of thousands or more. The increase in a number of antenna in an MIMO system may also lead to an increase in data throughput. Data movement using dynamic, random-access memory (DRAM) and static, random-access memory (SRAM) may be a bottleneck in these MIMO technologies, and this bottleneck may get worse with the adoption of B5G and 6G technologies.

DETAILED DESCRIPTION

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, and software operations have not been shown in detail in order to avoid unnecessarily obscuring the described embodiments of the present disclosure.

Generally described, MIMO systems (e.g., including massive MIMO and ultra-massive MIMO systems) with transceivers having one or more computing devices (e.g., processor unit(s)), memory controllers, and memory units (e.g., memory storage devices or flash memory). The massive MIMO systems may include hundreds of antenna and the ultra-massive MIMO systems may include thousands of antenna. The increase in a number of antenna may also increase an amount of data consumed by the transceivers of the MIMO system, including the base stations (BS) and user equipment (UE).

Typically, the memory units of the transceiver may execute read and write commands received from the memory controllers and/or directly from the computing device or from a network sending a memory command. Memory units may receive read or write commands as a sequence of instructions, with each instruction corresponding to a specific location identified by a memory address. For example, a read memory command may be processed by a memory controller as a request to read a specific address of a specific memory unit. Such a command may be sent to a memory device as an instruction to access that location of the memory device. A memory instruction may include such addressable information (e.g., row/column of memory cell and/or a logical address that points to a row/column of a memory cell), as determined by the memory controller based on the read memory command. For example, the location of the memory device may be at a particular physical memory cell in a logical memory partition of the memory device. in an example of a memory array as a memory unit, the memory controller may perform circuitry operations (e.g., charging row or column lines) to access particular physical memory cell. Such circuitry operations can be time-consuming and power consuming. Similarly, a memory controller determining which logical memory partition of a memory unit may include requested information that can be accessed at a specific memory rate can be a time-consuming and power consuming process for execution of memory commands.

In accessing specific memory cells of a memory unit, read or write commands may not differentiate where, physically, the information requested is stored in the memory unit. Also, a memory controller may not send instructions to the memory units based on any, pattern in which information has been stored in a memory unit. Memory units may receive write commands and, thereby, process writing to a memory unit, without regard to the specifics of an operation being performed or implemented in a processor or computing device. For example, a memory unit may receive a write command, and store information associated with that write command to a specific location in memory that has been determined to be available.

Computations in MIMO systems may include various data-intensive, matrix-based computations, such as matrix multiplications, matrix transforms, matrix inverses and/or matrix decompositions. These computations may involve repeatedly storing large amounts of data at and retrieving large amounts of data from the memory units. However, one aspect of the matrix-based computations in MIMO-based systems is that the matrix-based computations can often be distilled down into several repeatable patterns, which could be leveraged to move multiple data to or from the memory units during a same cycle or period. Examples of the patterns may include row-wise patterns, column-wise patterns, diagonal row/column patterns, and sub-matrix patterns (e.g., a smaller block of rows and columns)

Thus, operations being performed or implemented in transceiver of an MIMO system may include executing memory commands as defined by the particular operation being performed. For example, a specific sequence of memory access instructions to access memory cell of a memory array may include a sequence of memory access instructions defined by an operation order of the memory command. For example, memory may be accessed in a particular pattern which may facilitate tensor operations.

Tensors, which are generally geometric objects related to a linear system, may be utilized in machine learning and artificial intelligence applications. Tensor processing may include processing of matrix algebra or other linear systems analysis. Such processing may be intensive and repetitive, in that a common operand may be utilized several times, for example; in layered processing of tensors. Such repetition, combined with speed of processing, may necessitate repeated memory access to perform operations for tensor processing. Tensor operations may utilize matrix data, and accordingly may seek to read. and/or write data in a particular pattern (e.g., diagonal, etc.) In examples of a diagonal calculation for a matrix operation, a sequence of memory access instructions may access various memory cells along a diagonal of a memory array of the memory unit, in accordance with a diagonal memory command implemented by a memory controller coupled to that memory unit.

Figure 1:
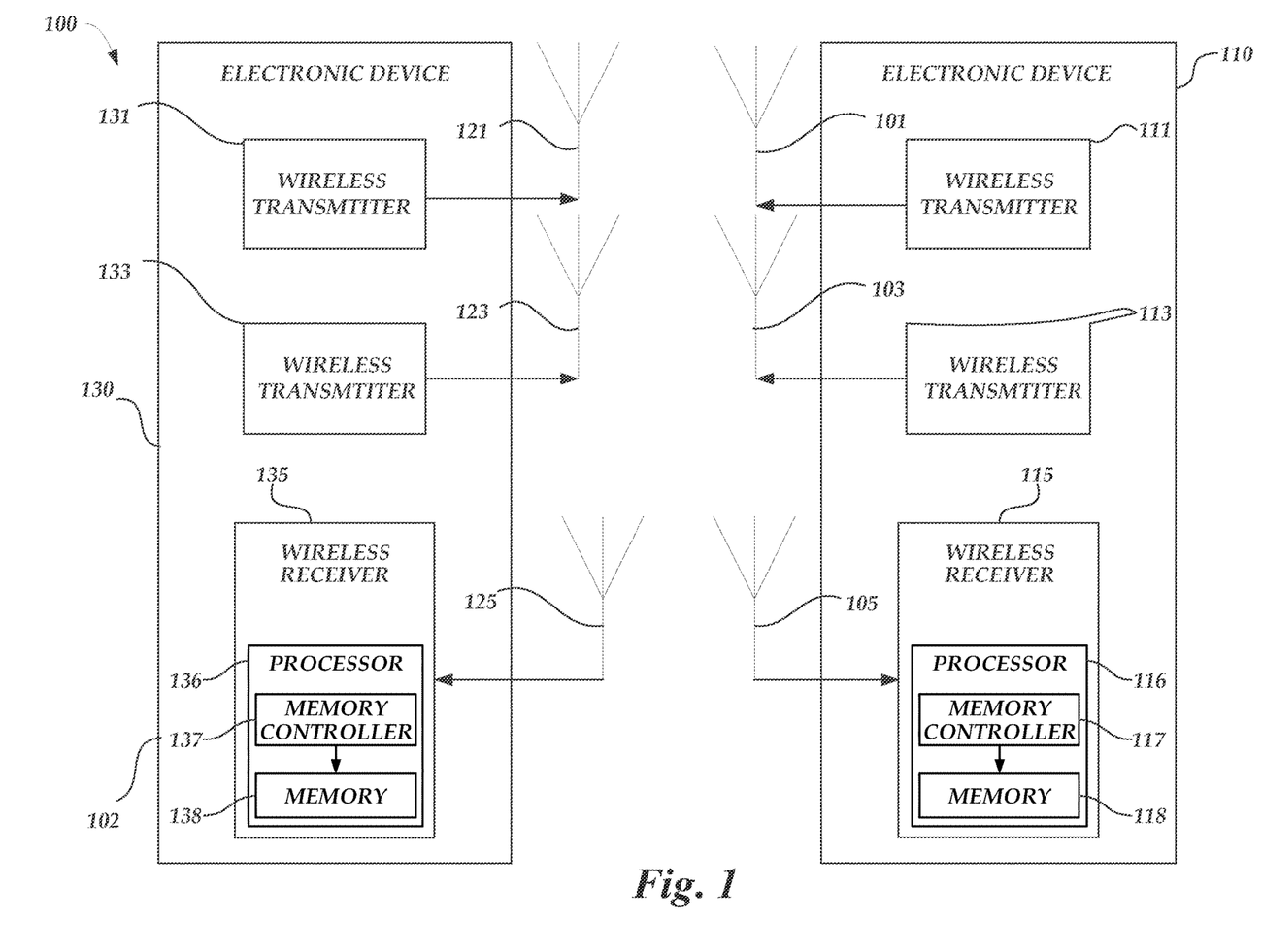
FIG. 1 is a schematic illustration of a system arranged in accordance with examples described herein.

FIG. 1 is a schematic illustration of a system 100 arranged in accordance with examples described herein. System 100 includes electronic device 102, electronic device 110, antenna 101, antenna 103, antenna 105, antenna 121, antenna 123, antenna 125, wireless transmitter 131, wireless transmitter 133, and wireless receiver 135. The electronic device 102 may include antenna 121, antenna 123, antenna 125, wireless transmitter 131, wireless transmitter 133, and wireless receiver 135. The electronic device 110 may include antenna 101, antenna 103, antenna 105, wireless transmitter 111, wireless transmitter 113, and wireless receiver 115. In some examples, electronic devices 102, 110 may operate in a full duplex transmission mode between the respective antennas of each electronic device. In an example of a full duplex transmission mode, wireless transmitter 131 coupled to antenna 121 may transmit to antenna 105 coupled to wireless receiver 115, while, at the same time or during at least a portion of the same time, wireless transmitter 111 coupled to antenna 101 may transmit to antenna 125 coupled to wireless receiver 135, in some examples at a same frequency or in a same frequency band. In other examples, electronic devices 102, 110 may operate in a half-full duplex transmission mode between the respective antennas of each electronic device, where each electronic device only transmits or receives at a given point in time. Example implementations of wireless receiver 115 and/or wireless receiver 135 may use an adaptive spatial diversity scheme for a MIMO system whose waveform is generated by an OFDM-based modulation scheme.

Electronic devices described herein, such as electronic device 102 and electronic device 110 shown in FIG. 1 may be implemented using generally any electronic device for which communication capability is desired. For example, electronic device 102 and/or electronic device 110 may be implemented using a mobile phone, smartwatch, computer (e.g. server, laptop, tablet, desktop), or radio. In some examples, the electronic device 102 and/or electronic device 110 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1, electronic device 102 and/or electronic device 110 may include any of a variety of components in some examples, including, but not limited to, memory, input/output devices, circuitry, processing units (e.g. processing elements and/or processors), or combinations thereof.

The electronic device 102 and the electronic device 110 may each include multiple antennas. For example, the electronic device 102 and electronic device 110 may each have more than two antenna. Four antenna each are shown in FIG. 1, but generally any number of antennas may be used, including hundreds or thousands of antenna. In some examples, the electronic device 102 and electronic device 110 may have a same number of antenna, as is shown in FIG. 1. In other examples, the electronic device 102 and electronic device 110 may have different numbers of antenna. Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems or "ultra-massive MIMO systems". Generally, massive MIMO systems refer to systems employing greater than a certain number (e.g. 64) antenna to transmit and/or receive transmissions, and ultra-massive MIMO systems may include thousands of antenna. As the number of antennas increase, so to generally does the complexity involved in accurately transmitting and/or receiving transmissions.

Although two electronic devices (e.g. electronic device 102 and electronic device 110) are shown in FIG. 1, generally the system 100 may include any number of electronic devices.

Electronic devices described herein may include receivers, transmitters, and/or transceivers. For example, the electronic device 102 of FIG. 1 includes wireless transmitter 131 and wireless receiver 135, and the electronic device 110 includes wireless transmitter 111 and wireless receiver 115, Generally, receivers may be provided for receiving transmissions from one or more connected antennas, transmitters may be provided for transmitting transmissions from one or more connected antennas, and transceivers may be provided for receiving and transmitting transmissions from one or more connected antennas. While both electronic devices 102, 110 are depicted in FIG. 1 with individual wireless transmitter and individual wireless receivers, it can be appreciated that a wireless transceiver may be coupled to antennas of the electronic device and operate as either a wireless transmitter or wireless receiver, to receive and transmit transmissions. For example, a transceiver of electronic device 102 may be used to provide transmissions to and/or receive transmissions from antenna 121, while other transceivers of electronic device 110 may be provided to provide transmissions to and/or receive transmissions from antenna 101 and antenna 103. Generally, multiple receivers, transmitters, and/or transceivers may be provided in an electronic device—one in communication with each of the antennas of the electronic device. The transmissions may be in accordance with any of a variety of protocols, including, but not limited to 5G signals, and/or a variety of modulation/demodulation schemes may be used including, but not limited to: orthogonal frequency division multiplexing (OFDM) filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards.

Examples of transmitters, receivers, and/or transceivers described herein, such as the wireless transmitter 131 and the wireless transmitter 111 may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

In some examples, the wireless receiver 135 may include a processor 136 having a memory controller 137 and a memory 138, and the wireless receiver 115 may include a processor 116 having a memory controller 117 and a memory 118. Typically, the memory 118 and the memory 138 of the wireless receivers 115 and 135, respectfully, may execute read and write commands received from the memory controllers 117 or memory controller 137 and/or directly from the processors 116 or 136 or from a network sending a memory command.

Computations in MIMO systems may include various data-intensive, matrix-based computations, such as matrix multiplications, matrix transforms, matrix inverses and' or matrix decompositions. These computations may involve repeatedly storing large amounts of data at and retrieving large amounts of data from the memory units. However, one aspect of the matrix-based computations in MIMO-based systems is that the matrix-based computations can often be distilled down into several repeatable patterns, which could be leveraged to move multiple data to or from the memory units during a same cycle or period. Examples of the patterns may include row-wise patterns, column-wise patterns, diagonal row/column patterns, and sub-matrix patterns (e.g., a smaller block of rows and columns).

Thus, operations being performed or implemented in wireless receiver 115 or 135 of the system 100 may include executing memory commands as defined by the particular operation being performed. For example, a specific sequence of memory access instructions to access memory cell of a memory array may include a sequence of memory access instructions defined by an operation order of the memory command. For example, the memory 118 or 138 may be accessed in a particular pattern which may facilitate tensor operations. That is the memory controller 117 and/or the memory controller 137 may be configured to process commands that define different access modes for the memory 118 and 138. For example, the memory controller 117 and the memory controller 137 may each include a respective data address generator configured to an access request associated with an instruction from the processor 116 or 136, respectively. The access request may identify a starting address P, an instruction mode M, a number of data represented by two numbers N/L. An example of the modes may include a row access mode (e.g., mode 0), a column access mode (e.g., mode 1), a diagonal access mode (e.g., mode 2, and a sub-matrix access mode (e.g., mode 3). Based on the access request mode and the amount of data, the data address generator may generate one or more new addresses beginning with the starting address P to be used to perform the access operation. In addition, the memory controller 117 and/or the memory controller 137 may each include a respective data buffer to store data read from the memory 118 or 138, respectively, during a read operation and to store data to be written to the memory 118 or 138, respectively, during a write operation. In some examples, a size of the data buffer may be at least twice a size of a maximum amount of data that can be written during a single access period or cycle. During a read operation, the data buffers may each be configured to temporarily hold read data received from the memory 118 or 138, respectively, and during a write operation, the data buffers may each be configured to temporarily hold write data to be stored at the memory 118 or 138, respectively.

Figure 2:
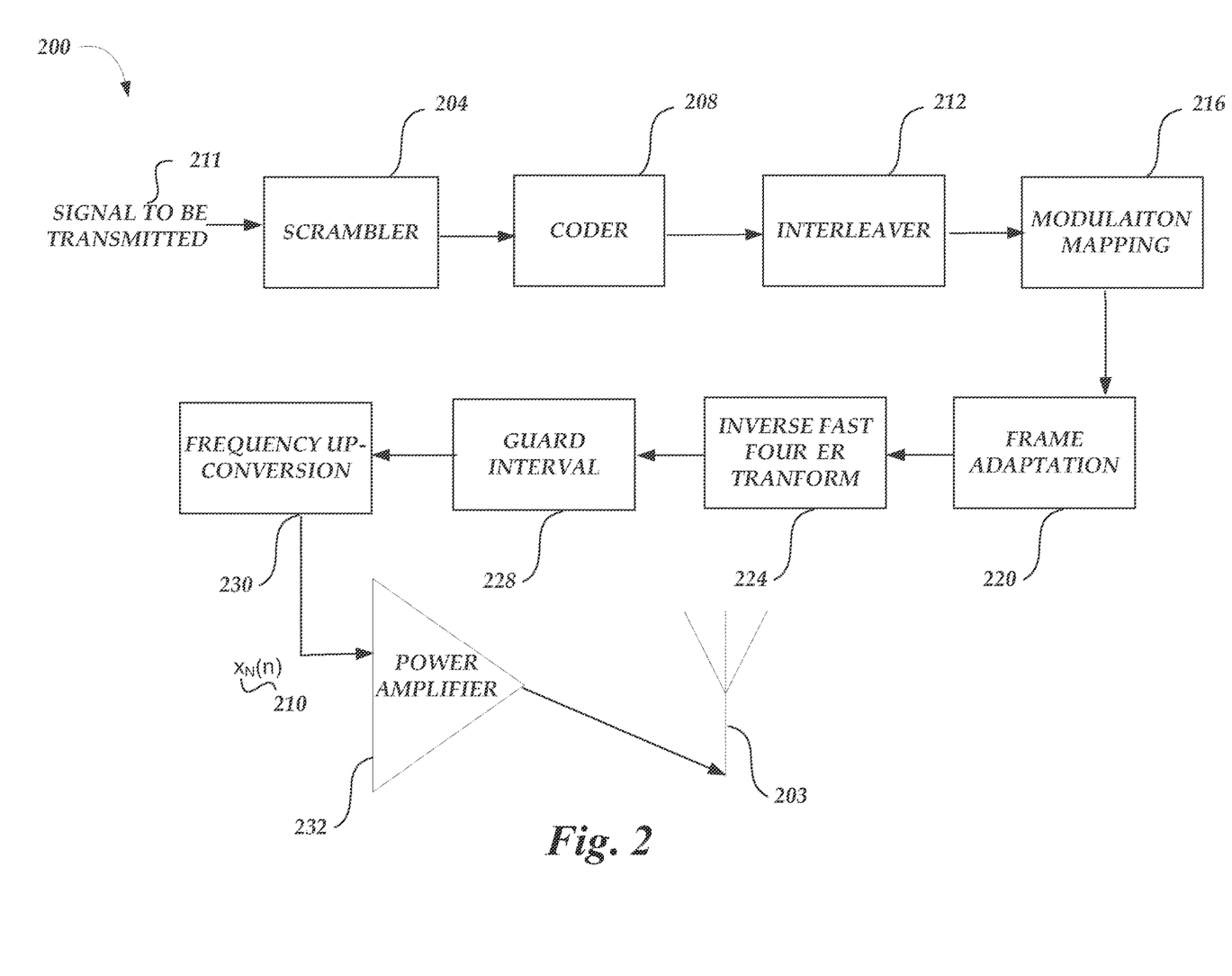
FIG. 2 is a schematic illustration of a wireless transmitter in accordance with examples described herein.

FIG. 2 is a schematic illustration of a wireless transmitter 200 in accordance with examples described herein. The wireless transmitter 200 receives a signal to be transmitted 211 and performs operations of an RF-front end to generate wireless communication signals for transmission via the antenna 203. The wireless transmitter 200 may be utilized to implement the wireless transmitters 111, 113, 131, or 133 of FIG. 1, for example. The transmitter output data $x_N(n)$ 210 is amplified by a power amplifier 232 before the output data are transmitted on an RF antenna 203. The operations of the RF-front end may generally, be performed with analog circuitry or processed as a digital baseband operation for implementation of a digital front-end. The operations of the RF-front end include a scrambler 204, a coder 208, an interleaver 212, a modulation mapping 216, a frame adaptation 220, an IFFT 224, a guard interval 228, and frequency up-conversion 230.

The scrambler 204 converts the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 204 are possible. The coder 208 may encode the data outputted from the scrambler to code the data. For example, a Reed-Solomon (RS) encoder or turbo encoder may be used as outer coder to generate a parity block for each randomized transport packet fed by the scrambler 204. In some examples, the length of parity block and the transport packet can vary according to various wireless protocols. The interleaver 212. may interleave the parity blocks output by the coder 208, for example, the interleaver 212 may utilize convolutional byte interleaving. In some examples, additional coding and interleaving can be performed after the coder 208 and interleaver 212. For example, additional coding may include an inner coder that may further code data output from the interleaver, for example, with a punctured convolutional coding having a certain constraint length. Additional interleaving may include an inner interleaver that forms groups of joined blocks. While described in the context of a RS coding, turbo coding, and punctured convolution coding, various coders 208 are possible, such as a low-density parity-check (LDPC) coder or a polar coder. While described in the context of convolutional byte interleaving, various interleavers 212 are possible.

The modulation mapping 216 modulates the data outputted from the interleaver 212. For example, quadrature amplitude modulation (QAM) can map the data by changing (e.g., modulating) the amplitude of the related carriers. Various modulation mappings may be possible, including, but not limited to: Quadrature Phase Shift Keying (QPSK), SCMA NOMA, and MUSA. (Multi-user Shared Access). Output from the modulation mapping 216 may be referred to as data symbols. While described in the context of QAM modulation, various modulation mappings 216 are possible. The frame adaptation 220 may arrange the output from the modulation mapping according to bit sequences that represent corresponding modulation symbols, carriers, and frames.

The IFFT 224 may transform symbols that have been framed into sub-carriers (e.g., by frame adaptation 220) into time-domain symbols. Taking an example of a 5G wireless protocol scheme, the IFFT can be applied as N-point IFFT:

$$x_k = \sum_{n=1}^{N} X_n e^{j2\pi kn/N} \quad (1)$$

where $X_n$ is the modulated symbol sent in the nth 5G sub-carrier. Accordingly, the output of the IFFT 224 may form time-domain 5G symbols. In some examples, the IFFT 224 may be replaced by a pulse shaping filter or poly-phase filtering banks to output symbols for frequency up-conversion 230. The guard interval 228 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme. The frequency up-conversion 230 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the SG symbols can be up-converted to a specific radio frequency for an RF transmission. Before transmission, at the antenna 203, a power amplifier 232 may amplify the transmitter output data $x_N(n)$ 210 to output data for an RF transmission in an RF domain at the antenna 203. The antenna 203 may be an antenna designed to radiate at a specific radio frequency. For example, the antenna 203 may radiate at the frequency at which the 5G symbols were up-converted. Accordingly, the wireless transmitter 200 may transmit an RF transmission via the antenna 203 according to the signal to be transmitted 211 received at the scrambler 204. As described above with respect to FIG. 2, the operations of the wireless transmitter 200 can include a variety of processing operations. Such operations can be implemented in a conventional wireless transmitter, with each operation implemented by specifically-designed hardware for that respective operation. For example, a DSP processing unit may be specifically-designed to implement the IFFT 224. As can be appreciated, additional operations of wireless transmitter 200 may be included in a conventional wireless receiver.

Figure 3:
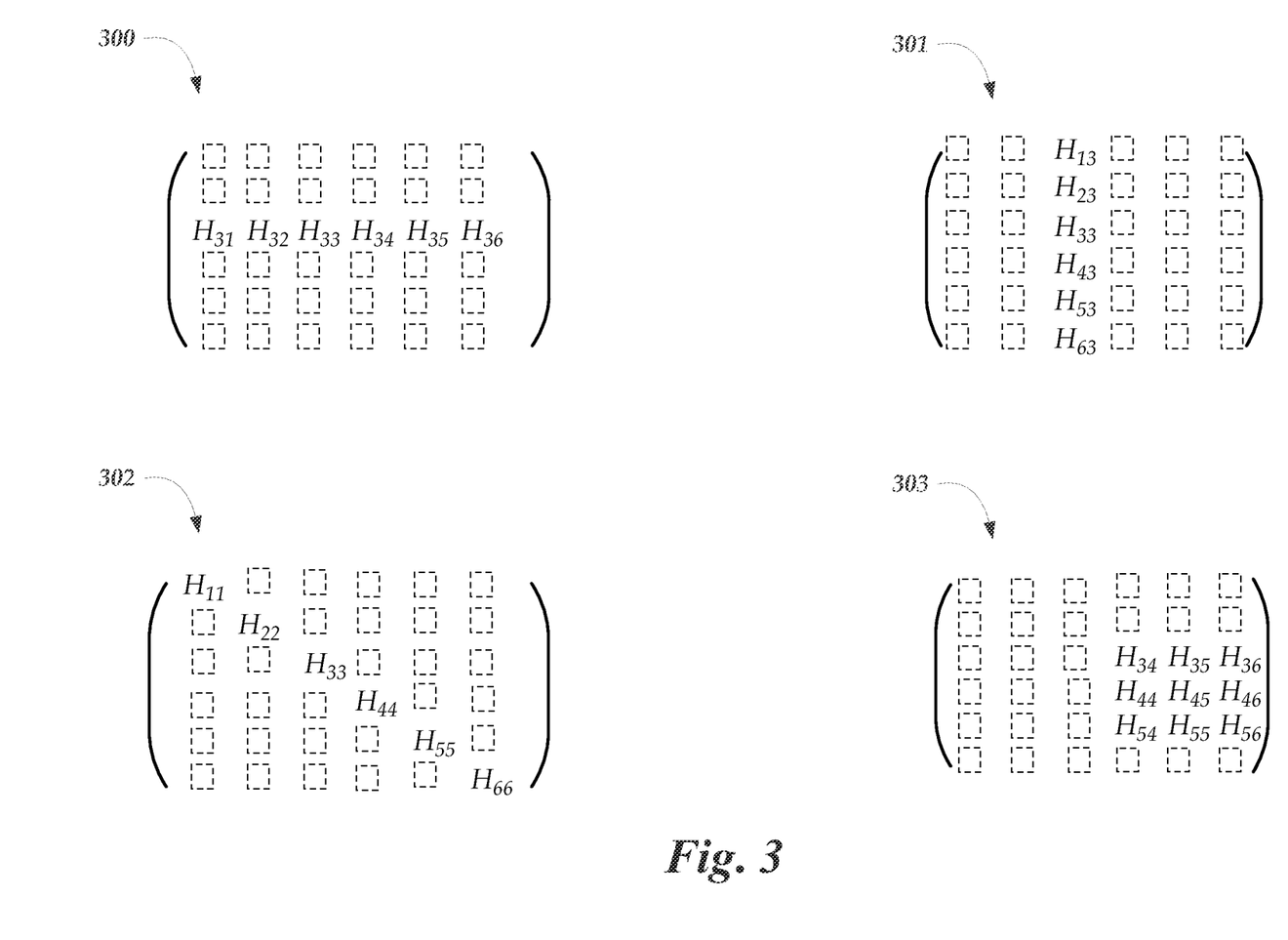
FIG. 3 is an illustration of access patterns of a memory unit in accordance with embodiments disclosed herein.

FIG. 3 is an illustration of access patterns of a memory unit in accordance with embodiments disclosed herein. Access pattern 300 is an illustration of a memory unit being accessed in accordance with a row access mode as part of a tensor operation. As shown in the access pattern 300, within a 6×6 memory cell array, row three is being accessed during the row access mode. Access pattern 301 is an illustration of a memory unit being accessed in accordance with a column access mode as part of a tensor operation. As shown in the access pattern 301, within a 6×memory cell array, column three is being accessed during the column access mode. Access pattern 302 is an illustration of a memory unit being accessed in accordance with a diagonal access mode as part of a tensor operation. As shown in the access pattern 302, within a 6×6 memory cell array, a diagonal line of memory cells starting from the upper, left corner and ending at the lower, right corner are being accessed during the diagonal access mode. Access pattern 303 is an illustration of a memory unit being accessed in accordance with a sub-matrix access mode as part of a tensor operation. As shown in the access pattern 303, within a 6×6 memory cell array, a 3×3 sub-matrix of memory cells (starting with cell (3, 4)) are being accessed during the sub-matrix access mode. Different or additional access patterns and corresponding access modes may be implemented without departing from the scope of the disclosure.

Figure 4:
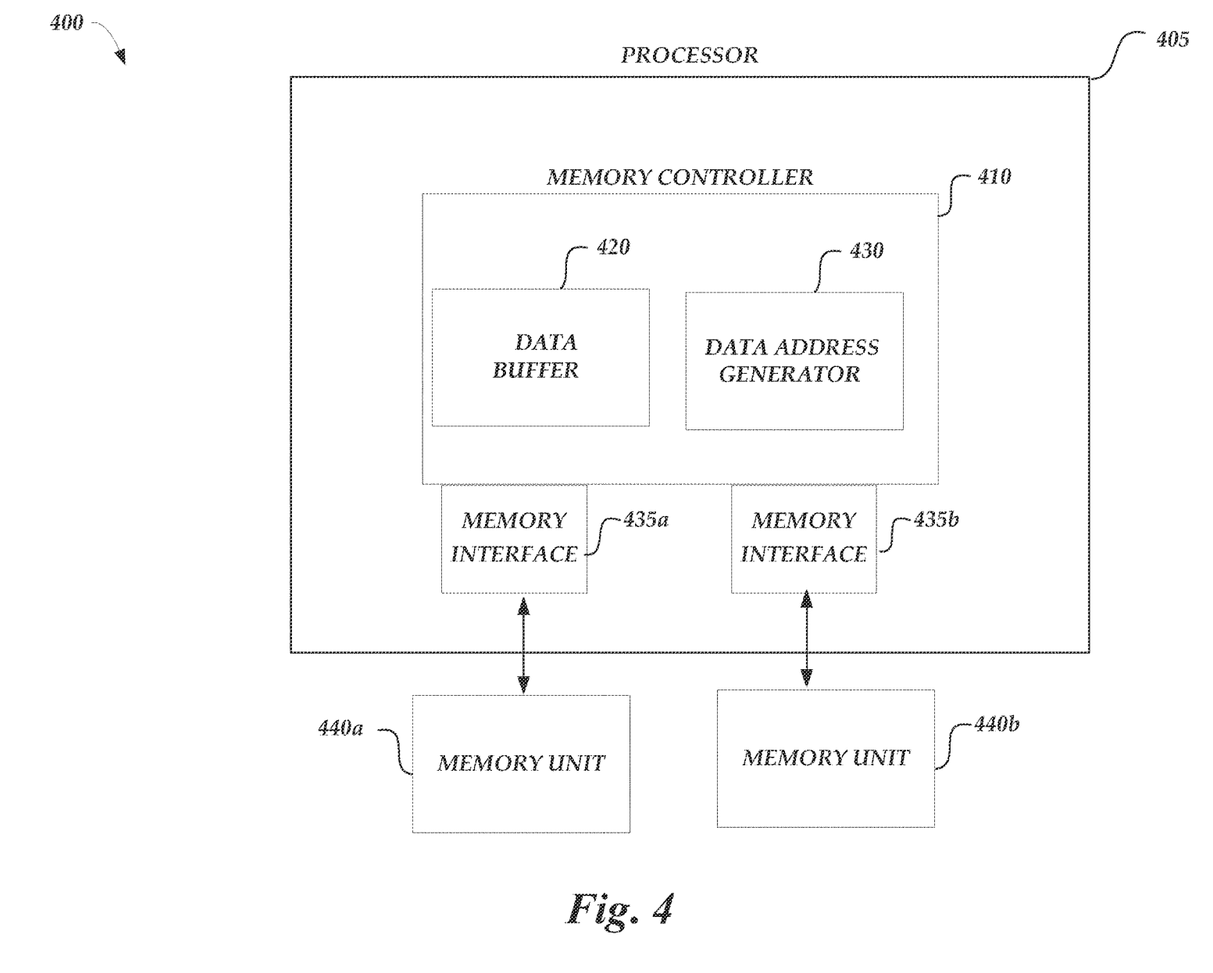
FIG. 4 is a schematic illustration of a transceiver computing system arranged in accordance with embodiments disclosed herein.

FIG. 4 is a schematic illustration of a transceiver computing system 400 arranged in accordance with embodiments disclosed herein. The transceiver computing system 400 may be implemented in a massive or ultra-massive MIMO system, in some examples. The transceiver computing system 400 includes a processor 405 coupled to memory units 440*a*, 440*b*. The processor 405 may implement a memory controller 410 that includes a data buffer 420 and an data address generator 430. The memory controller 410 may be coupled to the memory units 440*a*, 440*b* via memory interfaces 435*a*, 435*b*. The processor 405 may, implement memory commands received from various data sources or processes being executed on the processor 405. For example, the processor 405 may receive memory access requests (e.g., read or write commands) from a process being executed on the processor 405. In such a case, the memory controller 410 may process the memory access requests, as implemented by the processor 405, to access one or more of the memory units 440*a*, 440*b*. The electronic devices 102 and/or 110 of FIG. 1 may implement transceiver computing system 400 in some examples.

The processor 405 may be used to implement a memory system of the transceiver computing system 400 utilizing the memory controller 410. The processor 405 may be a multi-core processor in some examples that includes a plurality of cores. The plurality of cores may for example he implemented using processing circuits which read and execute program instructions independently. The memory controller 410 may handle communication with the memory system that may be outside of the processor 405. For example, the memory controller 410 may provide access commands to the memory units 440*a*, 440*b* from the plurality of cores of the processor 405. The memory controller 410 may provide such access commands via memory interfaces 435*a*, 435*b*. For example, the memory interfaces 435*a*, 435*b* may provide a clock signal, a command signal, and/or an address signal to any of the memory units 440*a*, 440*b*. While writing data by storing the data in the memory units 440*a*, 440*b*, the memory controller 410 provides instructions to write data to the memory units 440*a*, 440*b* based on a write command. While reading the stored data from the memory units 440*a*, 440*b*, the memory controller 410 provides instructions based on a read command and receives the data from the memory units 440*a*, 440*b*.

The memory controller 410 may be implemented using circuitry which controls the flow of data to the memory units 440*a*, 440*b*. The memory controller 410 may be a separate chip or integrated circuit coupled to the processor 405 or being implemented on the processor 405, for example, as a core of the processor 405 to control the memory system of the transceiver computing system 400. In some embodiments, the memory controller 410 may be integrated into the processor 405 to be referred to as integrated memory controller (IMC).

The memory controller 410 may communicate with a plurality of memory units to implement a memory system with the processor 405. For example, the memory units 440a, 440b, may communicate simultaneously with the memory controller 410. While the example of FIG. 4 depicts two memory units 440a, 440b, it can be expected that the memory controller 410 may interact with any number of memory units. For example, eight memory units may be included and each memory unit may include a data bus having an eight-bit width, thus the memory system implemented by the processor 405 may have a sixty-four bit width. The memory units 440a, 440b may be dynamic random-access memory (DRAM) or nonvolatile random-access memory (RAM), such as ferroelectric RAM (FeRAM), spin-transfer-torque RAM (STT-RAM), phase-change RAM (PCRAM), resistance change RAM (ReRAM), or the like. In various embodiments, such memory units may be referred to as memory chips, memory modules, memory dies, memory cards, memory devices, memory arrays, and/or memory cells. Physically, the memory units 440a, 440b may be arranged and disposed as one layer, or may be disposed as stacked layers. In some embodiment, the memory units 440a, 440b may be disposed as multiple layers, on top of each other, to form vertical memory, such as 3D NAND Flash memory.

In some examples where the memory units 440a, 440b may be implemented using DRAM. or non-volatile RAM integrated into a single semiconductor chip, the memory units 440a, 440b may be mounted on a memory module substrate, a mother board or the like. For example, the memory units 440a, 440b be referred to as memory chips. The memory units 440a, 440b may include a memory cell array region and a peripheral circuit region. The memory cell array region includes a memory cell array with a plurality of banks, each bank including a plurality of word lines, a plurality of bit lines, and a plurality of memory cells arranged at intersections of the plurality of word lines and the plurality of bit lines. The selection of the bit line may be performed by a plurality of column decoders and the selection of the word line may be performed by a plurality of row decoders.

The peripheral circuit region of the memory units 440a, 440b may include clock terminals, address terminals, command terminals, and data input/output (I/O) terminals (DQ). For example, the data I/O terminals may handle eight-bit data communication. Data input output (I/O) buffers may be coupled to the data input/output terminals (DQ) for data accesses, such as read accesses and write accesses of memories. The address terminals may receive address signals and bank address signals. The bank address signals may be used for selecting a bank among the plurality of banks. A row address and a column address may be provided as address signals. The command terminals may include a chip select (/CS) pin, a row address strobe (/RAS) pin, a column address strobe (/CAS) pin, a write enable (/WE) pin, and/or the like. A command decoder may decode command signals received at the command terminals from the memory controller 410 via one of the memory interfaces 435a, 435b, to receive various commands including a read command and/or a write command. Such a command decoder may provide control signals responsive to the received commands to control the memory cell array region. The clock terminals may be supplied with an external clock signal, for example from one of the memory interfaces 435a, 435b.

The data buffer 420 of the memory controller 410 may store data read from one or both of the memory units 440a and 440b during a read operation and to store data to be written to one or both of the memory units 440a and 440b during a write operation. In some examples, a size of the data buffer 420 may be at least twice a size of a maximum amount of data that can be written during a single access period or cycle. During a read operation, the data buffer 420 is configured to temporarily hold read data received from the memory units 440a and 440b and during a write operation, the data buffer 420 is configured to temporarily hold write data to be stored at the memory units 440a and 440b.

The data address generator 430 of the memory controller 410 may receive an access request associated with an instruction from the processor 405. The access request may identify a starting address P, an instruction mode M, a number of data represented by two numbers N/L. An example of the modes may include a row access mode (e.g., mode 0) (e.g., the access mode 300 of FIG. 3), a column access mode (e.g., mode 1) (e.g., the access mode 301 of FIG. 3), a diagonal access mode (e.g., mode 2) (e.g., the access mode 302 of FIG. 3), and a sub-matrix access mode (e.g., mode 3) (e.g., the access mode 303 of FIG. 3). Based on the access request mode and the amount of data, the data address generator may generate one or more new addresses beginning with the starting address P to be used to perform the access operation.

For example, in a first scenario (Scenario 1) the data address generator 430 may receive the following request from the processor 405: Read (P, 0, N, 1), which is a mode 0 (e.g., row access mode) with N data starting at address P. In response, the data address generator 430 may generate new addresses with starting at address P for reading the corresponding N data per row from one or both of the memory units 440a and 440b (step 1). In response, N data is read from one or both of the memory units 440a and 440b and is written to the data buffer 420 (step 2). The processor 405 may then send a next Read instruction to data address generator 430 and may read the previously requested N data from data buffer 420 (step 3). In response to the new Read command, the data address generator 430 and the data buffer 420 may Repeat Steps 1 and 2 for subsequent Read instructions (step 4). The processor 405 may repeat step 3 and data address generator 430 and the data buffer 420 may repeat step 4.

In another example (Scenario 2), the data address generator 430 may receive the following write request from the processor 405: Write(P, 0, N, 1), which is a mode 0 (e.g., row access mode) with N data starting at address P. In response, the processor 405 may write the N data to the data buffer 420 (step 1). In response to the command, the data address generator 430 may generate new addresses with starting at address P for writing the corresponding N data per row to one or both of the memory units 440a and 440b (step 2). In response, the N data may be read from the data buffer 420 and written to one or both of the memory units 440a and 440b (step 3). Steps 1-3 may be repeated during subsequent write instructions.

For a more complex case (e.g., sub-matrix case) (Scenario 3), the data address generator 430 may receive the following request from the processor 405: Read (P, 3, N, which is a mode 3 (e.g., sub-matrix access mode) with N×L data starting at address P. In response, the data address generator 430 may generate new addresses with starting at address P for reading the corresponding N×L data from one or both of the memory units 440a and 440b (step 1). In response, N×L data is read from one or both of the memory units 440a and 440b and is written to the data buffer 420 (step 2). The processor 405 may then send a next Read instruction to data address generator 430 and may read the previously requested N×L data from data buffer 420 (step 3). In response to the new Read command, the data address generator 430 and the data buffer 420 may Repeat Steps 1 and 2 for subsequent Read instructions (step 4). The processor 405 may repeat step 3 and data address generator 430 and the data buffer 420 may repeat step 4.

In a sub-matrix write example (Scenario 4), the data address generator 430 may receive the following write request from the processor 405: Write(P, 3, N, L), which is a mode 3 (e.g., sub-matrix access mode) with N×L data starting at address P. In response, the processor 405 may write the N×L data per sub-matrix to the data buffer 420 (step 1). In response to the command, the data address generator 430 may generate new addresses with starting at address P for writing the corresponding N×L data to one or both of the memory units 440a and 440b (step 2). In response, the N×L data may be read from the data buffer 420 and written to one or both of the memory units 440a and 440b (step 3). Steps 1-3 may be repeated during subsequent write instructions.

As shown in the above examples, the same methodology could also be applied to even more complex matrix and tensor access patterns, such as 3D sub-matrix (N×L×Q data), zigzag, Toeplitz, and triangle access patterns used in 5G and 6G applications without departing from the scope of the disclosure.

The above examples also demonstrate example implementations when subsequent instructions are common with the initial instruction. An example operation for when the initial instruction is a read instruction and a subsequent instruction is a write instruction (Scenario 5) may include: the data address generator 430 may receive the following request from the processor 405: Read (P1, 3, N1, L1). In response, the data address generator 430 may generate new addresses with starting at address P1 for reading the corresponding N1×L1 data from one or both of the memory units 440a and 440b (step 1). In response, N1×L1 data is read from one or both of the memory units 440a and 440b and is written to the data buffer 420 (step 2).

The data address generator 430 may then receive the following write request from the processor 405: Write(P2, 3, N2, L2). In response, the processor 405 may read the N1×L1 data from the data buffer 420 (step 3) and may write the N2×L2 data per sub-matrix to the data buffer 420 (step 4). In response to the write command, the data address generator 430 may generate new addresses with starting at address P2 for writing the corresponding N2×L2 data to one or both of the memory units 440a and 440b (step 5), and may read the N2×L2 data from the data buffer 420 and write it to one or both of the memory units 440a and 440b (step 6).

If a subsequent instruction is read instruction, then steps 1 and 2 may be repeated, and if the subsequent instruction is a write instruction, then steps 4, 5, and 6 may be repeated. Similar operations may be performed if an initial instruction is a write instruction, with the order flipped. In the examples above, if the previous command was a read command, a first step of the current command may include the processor 405 reading the read data stored at the data buffer 420. Similar operations may be performed for Modes 0, 1 and 2 without departing from the scope of the disclosure.

With the above pipeline execution flow, the proposed architecture could be able, in one instruction period, to read or write multiple data located in different physical addresses of data memory according to the processing patterns of matrix including per row, per column, per diagonal line, and per arbitrary sub-matrix. However, it should be noted that there might be one instruction period latency for "read" operations in this architecture. In addition, in some examples, reads and writes from the data buffer 420 to one or both of the memory units 440a and 440b is N×L may be faster than reads and write from the processor 405 to the data buffer 420 in the proposed solution.

If the processor 405 could perform K multiplications in one instruction period, the described access architecture could help the processor 405 perform min (K, N×L) times faster than a traditional DRAM/SRAM access architecture. In other words, the described architecture may deliver K or N×L times gains over traditional DRAM/SRAM access architecture for implementation of massive MIMO (5G) and ultra-massive MEM (6G) systems.

While the data buffer 420 has been described in the context of an implementation of the processor 405 as part of the memory controller 410, it can be expected that the data buffer 420 may also be implemented differently in other embodiments.

While the data address generator 430 has been described in the context of an implementation of the processor 405 as part of the memory controller 410, it can be expected that the data address generator 430 may also be implemented differently in other embodiments. For example, the data address generator 430 may be coupled to the processor 405 as a separate circuit such as the ASIC, a digital signal processor (DSP) implemented as part of a field-programmable gate array (FPGA), or a system-on-chip (SoC). As another example, the data address generator 430 may be coupled to the memory controller 410, being implemented by the processor 405, as a series of switches that identify respective addresses of a memory unit 440a, 440b to translate those identified addresses for a different memory map. The switches may be multiplexors, for example, with selected lines coupled to the memory controller 410.

Figure 5:
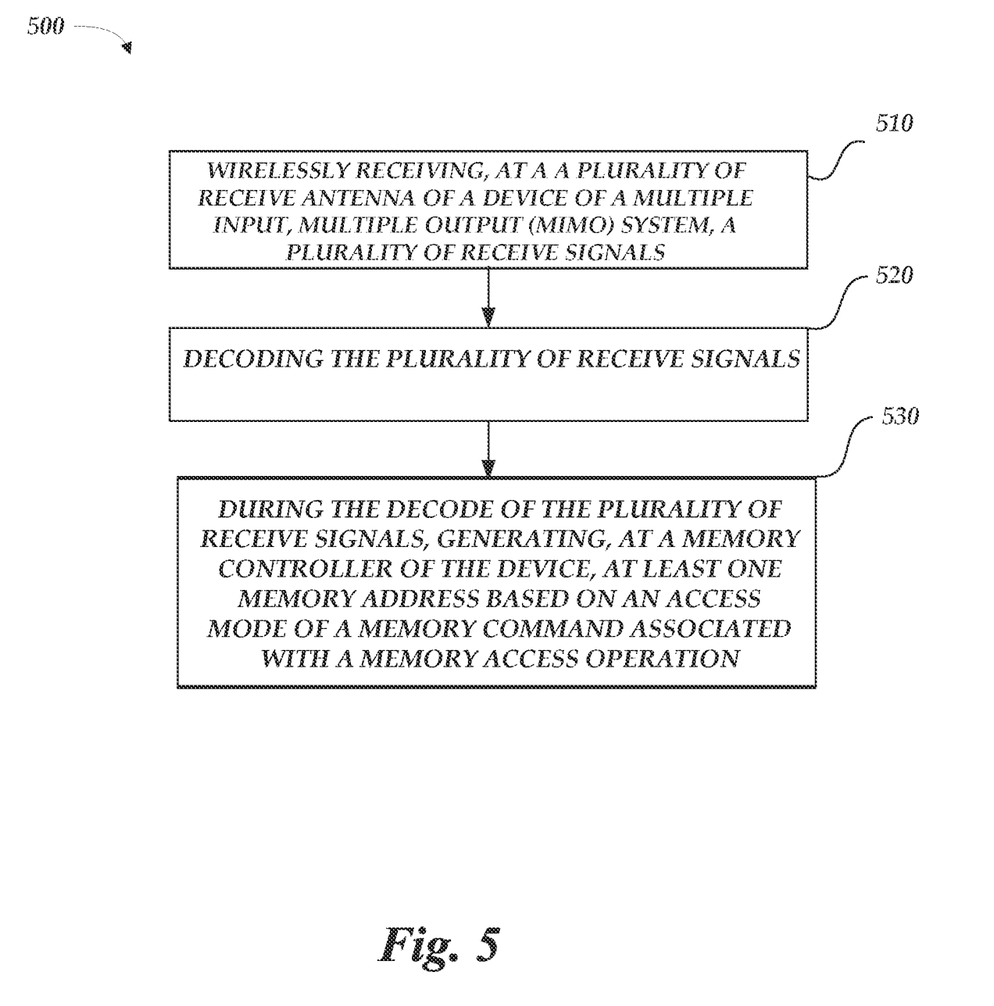
FIG. 5 is a flowchart of a method to access a memory of a MIMO system using a tensor access commands in accordance with embodiments disclosed herein.

FIG. 5 is a flowchart of a method 500 to access a memory of an MIMO system using a tensor access commands in accordance with embodiments disclosed herein. The method 500 may be implemented in the electronic device 102 or 110 of FIG. 1 and/or the transceiver computing system 400 of FIG. 4, in some examples.

The method 500 may include wirelessly receiving, at a plurality of receive antenna of a device of a multiple input, multiple output (MIMO) system, a plurality of receive signals, at 510. The plurality of receive antenna may include the antenna 105 or 125 of FIG. 1. The method 500 may further include decoding the plurality of receive signals, at 520.

The method 500 may further include during the decode of the plurality of receive signals, generating, at a memory controller of the device, at least one memory address based on an access mode of a memory command associated with a memory access operation, at 530. The at least one memory address corresponds to a specific sequence of memory access instructions to access a memory array. The memory controller may include the memory controller 117 or the memory controller 137 of FIG. 1 and/or the memory controller 410 of FIG. 4, in some examples. In some examples, the at least one address may be generated via a data address generator, such as the data address generator 430 of FIG. 4. In some examples, the method 500 may include receiving the memory command with the access mode identifying a specific type of memory access. In some examples, the specific type of memory access comprises a row access mode, a column access mode, a diagonal access mode, or a sub-matrix access mode. In some examples, the method 500 may include receiving a starting memory address with the memory command, and generating the at least one memory address based on the starting memory address. In some examples, the method 500 may include receiving a data size with the memory command indicating an amount of data to be retrieved from or written to the memory array, and generating the at least one memory address based on the data size.

In some examples, the method 500 may include, in response to the memory command including a write command, storing, at a data buffer of the memory controller, data to be written to the memory array, and in response to the memory command including a read command, storing, at the data buffer, data read from the memory array. The data buffer may include the data buffer 420 of FIG. 4.

Figure 6:
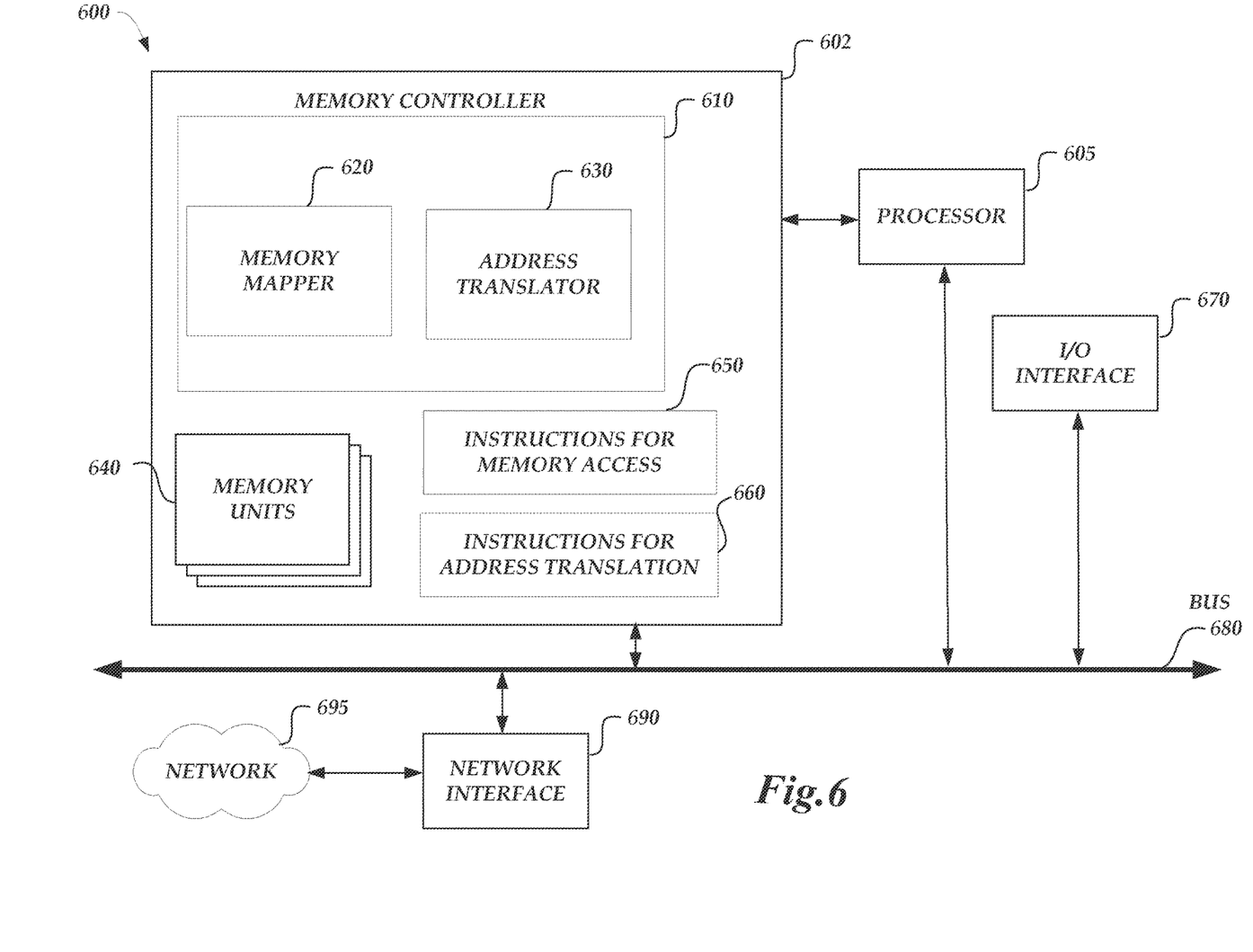
FIG. 6 is a schematic illustration of a computing system arranged in accordance with embodiments disclosed herein.

FIG. 6 is a schematic illustration of a computing system 600 arranged in accordance with embodiments disclosed herein. The computing device 600 may operate in accordance with any embodiment described herein. The computing device may be a smartphone, a wearable electronic device, a server, a computer, an appliance, a vehicle, or any type of electronic device. The computing system 600 includes a memory system 602, a processor 605, and I/O interface 670, and a network interface 690 coupled to a network 695. The memory system 602 includes a memory controller 610 having a data buffer 620 and data address generator 630, with both operating according to the functionality described herein with respect to a memory mapper and an address translator. Similarly numbered elements of FIG. 6 include analogous functionality to those numbered elements of FIG. 1. For example, the memory units 640 may operate and be configured like the memory units 440a, 440b of FIG. 4. Processor 605 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for system 600. The electronic devices 102 and/or 110 of FIG. 1 may implement the computing system 600, in some examples, and/or the transceiver computing system 400 of FIG. 4 may be implemented in the computing system 600 in some examples.

The memory system 602 also includes memory units 640 and non-transitory hardware readable medium 650, 660 including instructions, respectively, for memory access and address translation. The processor 605 may control the memory system 602 with control instructions that indicate when to execute the instructions for memory access 650 and/or the instructions for address translation 660. Upon receiving such control instructions, the data buffer 620 may execute the instructions for memory access 650; and/or the data address generator 630 may execute the instructions for address translation 660. The instructions for memory access 650 may include a program that executes the method 500. The instructions for address translation 660 may include a program that executes the method 400. Communications between the processor 605, the I/O interface 670, and the network interface 690 are provided via a processor internal bus 680. The processor 605 may receive control instructions from the I/O interface 670 or the network interface 690, such as instructions to control execution of memory access or address translation.

Bus 680 may include one or more physical buses, communication lines/interfaces, and/or point-to-point connections, such as Peripheral Component Interconnect (PCI) bus. The I/O interface 670 can include various user interfaces including video and/or audio interfaces for the user, such as a tablet display with a microphone. Network interface 690 communications with other computing devices, such as computing device 600 or a cloud-computing server, over the network 695. For example, the network interface 690 may be a USB interface.

From the foregoing it will be expected that, although specific embodiments of the present disclosure have been described herein for purposes of illustration, various modifications may be made without deviating from the spirit and scope of the present disclosure.

What is claimed is:

1. An apparatus comprising:
a plurality of receive antenna configured to receive a plurality of receive signals, wherein the plurality of receive antenna are included in an ultra-massive multiple input, multiple output (MIMO) system; and
a wireless transceiver coupled to the plurality of antenna and configured to receive and decode the plurality of receive signals, wherein the wireless transceiver comprises a memory array and a memory controller, wherein the memory controller comprises a data address generator configured to generate at least one memory address based on an access mode of a memory command associated with a memory access operation, wherein the at least one memory address corresponds to a specific sequence of memory access instructions to access a memory cell of the memory array, and wherein the data address generator is configured to generate the at least one memory address during the decode of the plurality of receive signals by the transceiver,
wherein the access mode identifies a specific type of memory access, and
wherein the specific type of memory access comprises a 3D sub-matrix, zigzag Toeplitz or triangle access patterns.

2. The apparatus of claim 1, wherein the specific type of memory access further comprises a row access mode, a column access mode, a diagonal access mode, or a sub-matrix access mode.

3. The apparatus of claim 1, wherein each memory access instruction of the specific sequence of memory access instructions comprises an instruction for a respective one of the at least one memory address.

4. The apparatus of claim 1, wherein the transceiver comprises a processor configured to send a host command to the memory controller during the decode of the plurality of receive signals, wherein the memory command is based on the host command.

5. The apparatus of claim 1, wherein the memory controller is configured to receive a starting memory address with the memory command, wherein the data address generator is configured to use the starting memory address to generate the at least one memory address.

6. The apparatus of claim 1, wherein the memory controller is configured to receive a data size with the memory command indicating an amount of data to be retrieved from or written to the memory array, wherein the data address generator is configured to use the data size to generate the at least one memory address.

7. The apparatus of claim 1, wherein the memory controller further comprises a data buffer configured to store data associated with the memory command.

8. The apparatus of claim 7, wherein, in response to the memory command including a write command, the data buffer is configured to store data to be written to the memory array, wherein, in response to the memory command including a read command, the data buffer is configured to store data to read from the memory array.

9. A multiple input, multiple output (MIMO) device, comprising:
a plurality of transmit antenna configured to transmit a plurality of transmit signals;

a plurality of transmit antenna configured to receive a plurality of receive signals, wherein the plurality of transmit antenna configured to transmit the plurality of transmit signals and the plurality of transmit antenna configured to receive the plurality of receive signals are included in an ultra-massive MIMO system; and a transceiver coupled to the plurality of transmit antenna and to the plurality of receive antenna; wherein the transceiver is configured to receive and decode the plurality of receive signals and to encode the plurality of transmit signals based on the decode of the plurality of receive signals, wherein the transceiver comprises a memory controller configured to generate at least one memory address based on an access mode of a memory command associated with a memory access operation, wherein the at least one memory address corresponds to a specific sequence of memory access instructions to access a memory array, and wherein the memory controller is configured to generate the at least one memory address during the decode of the plurality of receive signals by the transceiver, wherein the access mode identifies a specific type of memory access, and wherein the specific type of memory access comprises a 3D sub-matrix, zigzag, Toeplitz, or triangle access patterns.

10. The MIMO device of claim 9, wherein the memory command is a read command or a write command.

11. The MIMO device of claim 9, wherein the specific type of memory access further comprises a row access mode, a column access mode, a diagonal access mode, or a sub-matrix access mode.

12. The MIMO device of claim 9, wherein the memory controller is configured to receive a starting memory address with the memory command and to use the starting memory address to generate the at least one memory address.

13. The MIMO device of claim 9, wherein the memory controller is configured to receive a data size with the memory command indicating an amount of data to be retrieved from or written to the memory array and to use the data size to generate the at least one memory address.

14. A method comprising:
wirelessly receiving, at a plurality of receive antenna of a device of an ultra-massive multiple input, multiple output (MIMO) system, a plurality of receive signals;
decoding, by a transceiver of the device, the plurality of receive signals;
during the decode of the plurality of receive signals by the transceiver of the device, generating, at a memory controller of the device, at least one memory address based on an access mode of a memory command associated with a memory access operation, wherein the at least one memory address corresponds to a specific sequence of memory access instructions to access a memory array; and
receiving the memory command with the access mode identifying a specific type of memory access,
wherein the specific type of memory access comprises a 3D sub-matrix, zigzag, Toeplitz or triangle access patterns.

15. The method of claim 14, wherein the specific type of memory access further comprises a row access mode, a column access mode, a diagonal access mode, or a sub-matrix access mode.

16. The method of claim 14, further comprising:
receiving a starting memory address with the memory command; and
generating the at least one memory address based on the starting memory address.

17. The method of claim 14, further comprising:
receiving a data size with the memory command indicating an amount of data to be retrieved from or written to the memory array; and
generating the at least one memory address based on the data size.

18. The method of claim 14, further comprising:
in response to the memory command including a write command, storing, at a data buffer of the memory controller, data to be written to the memory array; and
in response to the memory command including a read command, storing, at the data buffer, data read from the memory array.

* * * * *

UNITED STATES PATENT AND TRADEMARK OFFICE
CERTIFICATE OF CORRECTION

PATENT NO. : 12,340,117 B2
APPLICATION NO. : 17/929954
DATED : June 24, 2025
INVENTOR(S) : Fa-Long Luo and Jaime Cummins Page 1 of 1

It is certified that error appears in the above-identified patent and that said Letters Patent is hereby corrected as shown below:

In the Claims

| Column | Line | Claim | Reads | Should Read |
|---|---|---|---|---|
| 14 | 29 | 1 | wherein the specific type of memory access comprises a 3D sub-matrix, zigzag Toeplitz or triangle access patterns. | wherein the specific type of memory access comprises a 3D sub-matrix, zigzag, Toeplitz, or triangle access patterns. |
| 16 | 18 | 14 | wherein the specific type of memory access comprises a 3D sub-matrix, zigzag, Toeplitz or triangle access patterns. | wherein the specific type of memory access comprises a 3D sub-matrix, zigzag, Toeplitz, or triangle access patterns. |

Signed and Sealed this
Second Day of September, 2025

Coke Morgan Stewart
*Acting Director of the United States Patent and Trademark Office*